B. E. MAXWELL.
PNEUMATIC TIRE CUTTING MACHINE.
APPLICATION FILED NOV. 18, 1920.
1,412,951.
Patented Apr. 18, 1922.
2 SHEETS—SHEET 2.
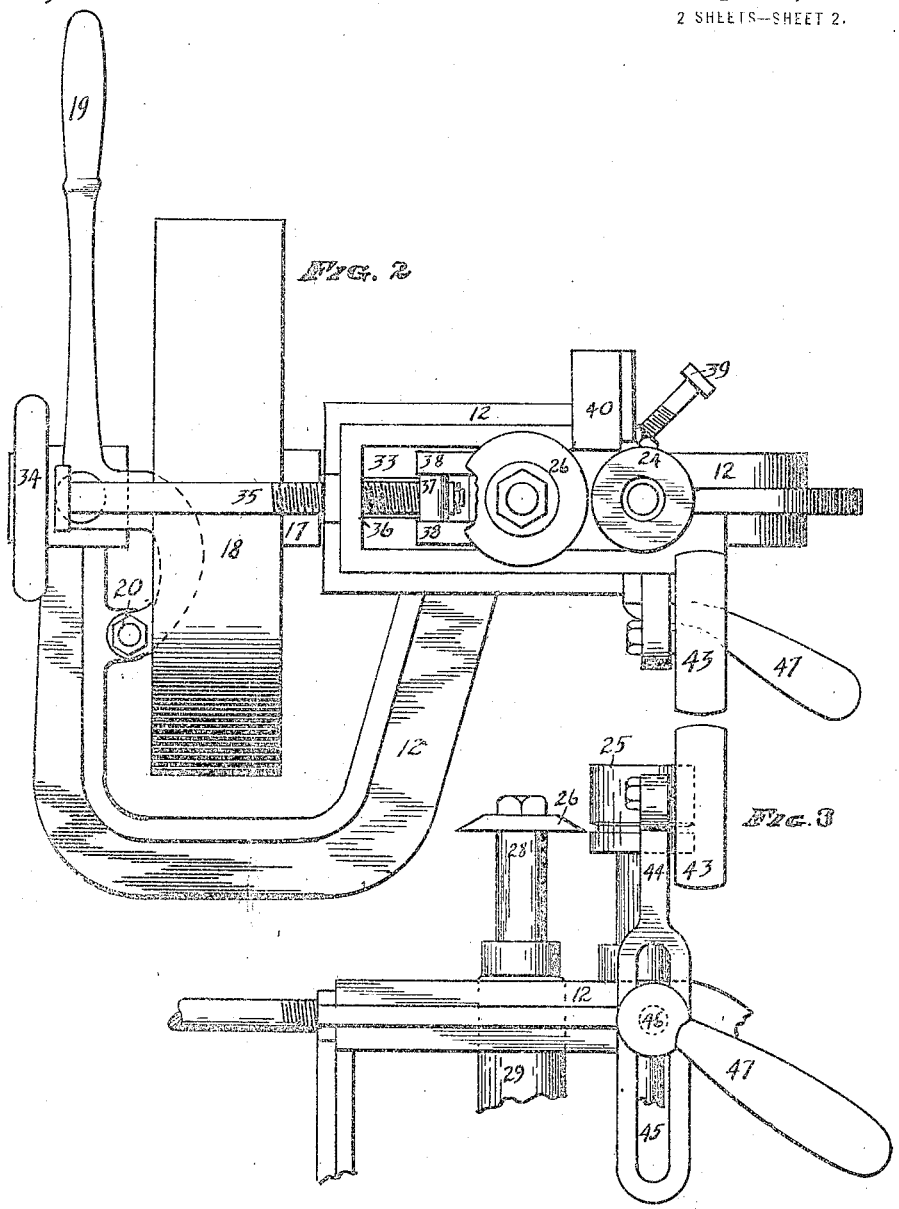
INVENTOR
Bert E. Maxwell
BY
U. S. Charles
ATTORNEY

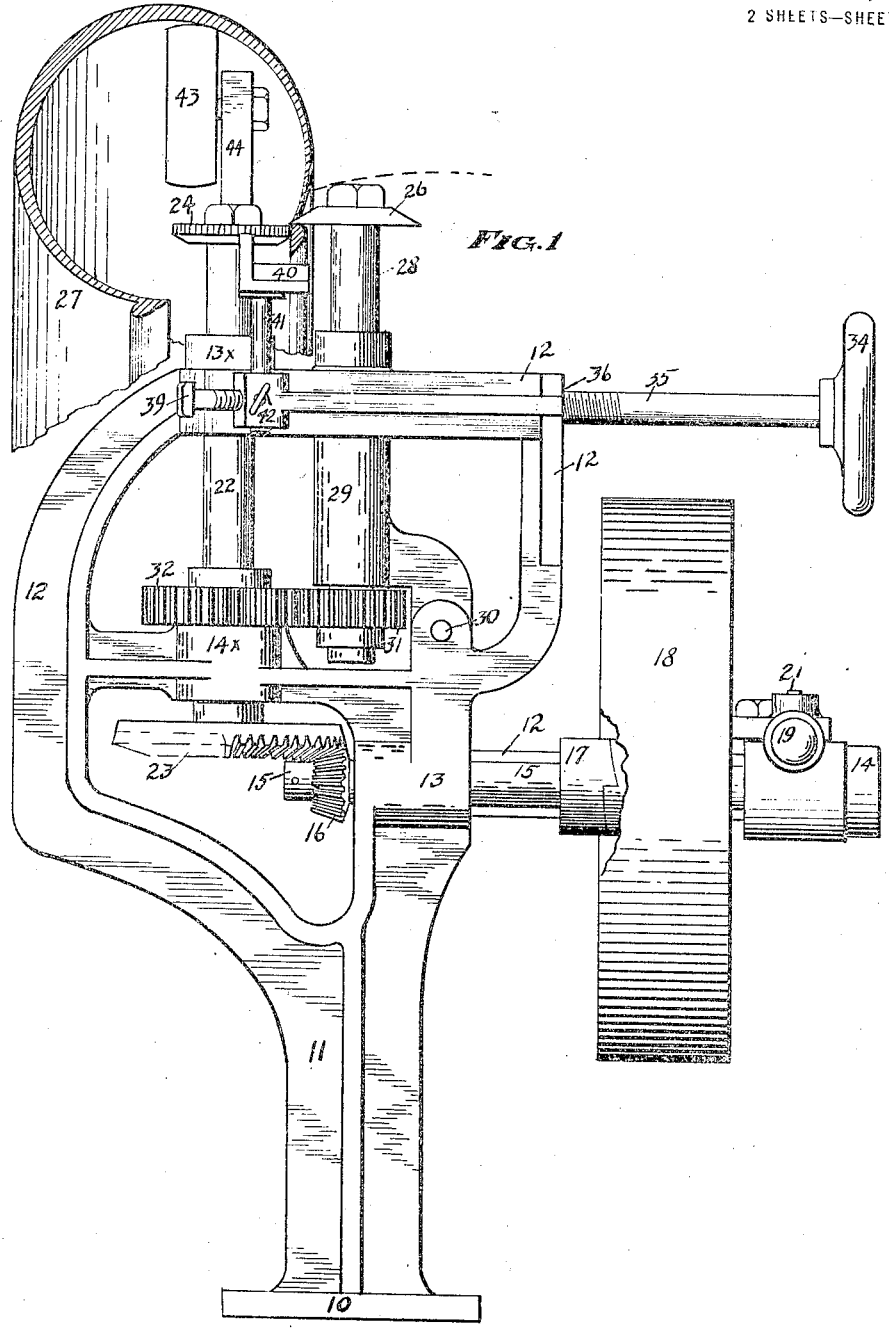

UNITED STATES PATENT OFFICE.

BERT E. MAXWELL, OF WICHITA, KANSAS.

PNEUMATIC-TIRE-CUTTING MACHINE.

1,412,931.  Specification of Letters Patent.  Patented Apr. 18, 1922.

Application filed November 18, 1920. Serial No. 424,931.

*To all whom it may concern:*

Be it known that I, BERT E. MAXWELL, a citizen of the United States, residing at Wichita, in the county of Sedgwick and State of Kansas, have invented certain new and useful Improvements in a Pneumatic-Tire-Cutting Machine, of which the following is a description, referring to the drawings, which form a part of this specification.

The invention relates to a machine, useful in shearing off the bead of tire casings and also to kerf through the fabricated body to a predetermined depth so as to leave a portion of the fabric uncut.

In the drawings, Fig. 1 represents a side elevation of the machine and illustrates the method and means employed for severing the bead of a tire casing as employed in actual practice. Fig. 2 represents a top view of the structural elements disclosed in Fig. 1. Fig. 3 is a fragmentary detail view of the cutting elements of the invention as employed where a predetermined depth of cutting is desirable. Similar numerals of reference indicate corresponding parts throughout the drawings.

Referring to the drawings, 10 represents the base of the machine frame supporting a standard 11 from which portions 12 of the frame diverge to house the operative elements of the machine. Mounted in the housings 13, 14 is seen the drive shaft 15 to which is fixedly fastened the clutch ratchet. At 18 is the pulley wheel revolvably mounted on the shaft 15 and provided with a hub having a clutch face adapted to engage the ratchet 17. A lever 19 is pivotally mounted at 20 to an arm 12 of the frame and is provided with a spring catch 21 for maintaining a desired position of said lever with reference to the pulley 18. The lever 19 operates to engage or disengage the pulley 18 from the ratchet 17, at the will of the operator.

At 22 is seen the vertical feeding shaft, journalled in bearings 13×, 14× on the frame 12. This shaft is driven by means of its beveled gear 23 in mesh with the bevel gear 16 on the drive shaft 15. To the upper end of the shaft 22, Fig. 1 is secured a disc-like feed roll 24, preferably provided with a milled periphery.

In Fig. 3, a feed roller 25 is shown used in lieu of the disc 24, the purpose of the disc 24 and roller 25 being to create a resistance against the motion of the cutter 26 whereby a tire casing 27 can be fed between the cutter and the disc or roller for the purposes of the invention.

The disc cutter 26 is mounted on a shaft 28 journalled in the housing 29 pivotally mounted at 30 to the frame 12. The shaft 28 carries a gear 31 driven by the gear 32 on the feed shaft 22; the gear 32 is larger than the gear 31 in order that the feeding revolutions will be slower than the cutting revolutions so that a sawing or sliding motion of the cutting disc 26 will operate to produce a clean cut in the casing under operative conditions.

The frame 12 is slotted at 33 to receive the upper portion of the housing 29. A hand wheel 34 rigid with the screw 35 controls the movement of said screw as threaded through the frame 12 at 36. This screw 35 connects to a member 37, pivotally engaging arms 38, 38 rigid with the housing 29. By means of the handwheel 34 and screw 35 adjustment, the housing 29 is pivotally moved, inwardly or outwardly by the operator so that the purposes of the invention may be accomplished. As seen in Fig. 1 the wheel 34 has been turned so that the edge of the cutting disc 26 will entirely sever the bead of the casing as fed between the feed roll 24 and the cutting disc 26; while in Fig. 3 by means of the adjustment, a desired space is obtained between the cutting disc 26 and the roller 25 whereby a cut of predetermined depth may be made in the casing or other materials as fed between the parts. It will be noted that the gear 31 will slide upwardly and downwardly in the pivotal adjustment of the housing 29 but will remain in mesh with the gear 32 at any point in such adjustment.

The set screw 39 is threaded through the frame 12. After the adjustment of the housing 29 has been accomplished by means of the hand wheel 34 and screw 35, the screw 39 is set to bear against the housing 29 to maintain the desired adjustment or spacing of the disc cutter 26 from the feed rollers 24 or 25 as employed.

A lower guide or rest 40 supports the bead of the casing 27 as clearly seen in Fig. 1; this rest is adjustably raised or lowered as desired by means of a shank 41 passing through the frame 12 and made stationary by means of the thumb screw 42. The casing 27 is further supported by means of a roller 43 journalled on the upper end of an arm 44, provided with a slot 45 in its lower end through which passes the binding post 46 operated by the hand lever 47. It is obvious that the roller 43 may be raised or lowered within the limits provided by the slot 45 to properly support the casing as seen in Fig. 1.

Such modifications may be employed as lie within the scope of the appended claims.

Having fully described my invention, what I now claim as new and desire to secure by Letters Patent is:

1. A cutting machine including a framework, a horizontal drive shaft rotatably mounted therein, a pulley wheel, clutch and clutch operating mechanism carried by said shaft; a vertical feed shaft rotatably mounted in said framework, a feed roller thereon; an upright shaft, a disc cutter on said shaft arranged in operative proximity to said feed roller; gearing arranged on said shafts whereby driveshaft operation drives said feed roller at a slower speed than the disc cutter for the purposes specified.

2. A cutting machine including a framework, a drive shaft rotatably mounted therein, a pulley wheel, clutch and clutch operating mechanism operatively coacting with said drive shaft; an upright feed shaft rotatably mounted in said framework, a feed roller thereon; an upright shaft housing pivotally connecting to said framework, a shaft in said housing a disc cutter on said shaft and means for securing and maintaining said disc cutter in relative proximity to said feed roller; gearing arranged on the several shafts in operative series, whereby drive shaft operation drives said feed roller at a slower speed than the disc cutter for the purposes of the invention.

3. A cutting machine including a framework, a drive shaft rotatably mounted therein, a pulley wheel, clutch and clutch operating mechanism operatively coacting with said drive shaft; a vertical feed shaft rotatably mounted in said framework, a feed roller thereon; an upright shaft housing pivotally connecting to said framework, a shaft in said housing, a disc cutter on said shaft and means for securing and maintaining said disc cutter in relative proximity to said feed roller including an adjusting screw threaded through said framework pivotally engaging to said pivoted shaft housing and a set screw through said framehousing and a set screw through said framework adjustable to oppose the force exerted by the adjusting screw on said shaft housing; gearing arranged on said shafts in operative series whereby drive shaft rotation drives said feed roller at a slower speed than the disc cutter for the purposes as specified.

4. A cutting machine including a framework, a horizontal drive shaft rotatably mounted therein, a pulley wheel, clutch and clutch operating mechanism coacting with said drive shaft in combination; a vertical feed shaft rotatably mounted in said framework, a feed roller thereon; an upright shaft housing pivotally connecting to said framework, a shaft in said housing, a disc cutter on said shaft and means for securing and maintaining said disc cutter in relative proximity to said feed roller including an adjusting screw threaded through said framework pivotally engaging to said pivoted shaft housing and a set screw through said framework adjustable to oppose the force exerted by the adjusting screw on said shaft housing; a lower and an upper support, each adjustably mounted from said framework and adapted to carry a tire casing towards and between said feed roller and cutting disc, a roller journalled on said upper support; gearing arranged on the several shafts in operative series, whereby drive shaft operation serves to drive said feed roller at a slower speed than the disc cutter for the purposes of the invention.

BERT E. MAXWELL.

Witnesses:
M. Y. CHARLES,
W. A. NETHESCOT.